(12) United States Patent
Van Niekerk (10) Patent No.: US 10,946,960 B2
(45) Date of Patent: Mar. 16, 2021

(54) ANOMALOUS PAYLOAD DETECTION FOR MULTIROTOR UNMANNED AERIAL SYSTEMS

(71) Applicant: Vantage Robotics, LLC, San Francisco, CA (US)

(72) Inventor: Johannes Becker Van Niekerk, Livermore, CA (US)

(73) Assignee: Vantage Robotics, LLC, San Leandro, CA (US)

(*) Notice: Subject to any disclaimer, the term of this patent is extended or adjusted under 35 U.S.C. 154(b) by 0 days.

(21) Appl. No.: 16/198,295

(22) Filed: Nov. 21, 2018

(65) Prior Publication Data

US 2019/0152597 A1    May 23, 2019

Related U.S. Application Data

(60) Provisional application No. 62/589,221, filed on Nov. 21, 2017.

(51) Int. Cl.
| | |
|---|---|
| *G06G 7/70* | (2006.01) |
| *B64C 39/02* | (2006.01) |
| *G05D 1/10* | (2006.01) |
| *G07C 5/08* | (2006.01) |

(52) U.S. Cl.
CPC .......... *B64C 39/024* (2013.01); *G05D 1/101* (2013.01); *G07C 5/08* (2013.01); *B64C 2201/027* (2013.01); *B64C 2201/141* (2013.01)

(58) Field of Classification Search
CPC ............ B64C 39/024; B64C 2201/027; B64C 2201/141; G07C 5/08; G07C 5/0841; G05D 1/101; G06G 7/70

USPC ............... 701/2, 16; 244/2, 75.1; 307/9.1
See application file for complete search history.

(56) References Cited

U.S. PATENT DOCUMENTS

| | | | | |
|---|---|---|---|---|
| 9,412,278 | B1 * | 8/2016 | Gong ...................... | G06F 16/29 |
| 9,415,870 | B1 * | 8/2016 | Beckman .............. | B64C 39/024 |
| 9,802,702 | B1 * | 10/2017 | Beckman .............. | B64C 39/024 |
| 2012/0292441 | A1 * | 11/2012 | Drela ...................... | B64C 21/06 |
| | | | | 244/1 N |
| 2013/0285440 | A1 * | 10/2013 | Pan ........................ | H01L 31/046 |
| | | | | 307/9.1 |
| 2016/0328979 | A1 * | 11/2016 | Postrel .................. | H04W 4/029 |
| 2017/0061813 | A1 * | 3/2017 | Tao ......................... | G09B 9/08 |
| 2018/0164819 | A1 * | 6/2018 | Zhang ...................... | B64F 5/60 |
| 2018/0244404 | A1 * | 8/2018 | Park ......................... | B64F 1/007 |
| 2018/0267543 | A1 * | 9/2018 | McGuire, Jr. .......... | G05D 1/0202 |

(Continued)

*Primary Examiner* — Shardul D Patel
(74) *Attorney, Agent, or Firm* — Knobbe, Martens, Olson & Bear, LLP (57) ABSTRACT

A modular unmanned aerial system (UAS) can be configured to detect an anomalous UAS configuration or operating condition, and to notify the user or inhibit further operation of the UAS in response to such a detection. An indication of the actual rotational speed of the motor or of the flight power needed to hold the UAS in a hover state may be compared to a predicted value based upon the expected UAS configuration. A variance between the actual values and the predicted values may indicate that the UAS is in an unauthorized configuration, which may be due to an unauthorized payload. The UAS may be a modular system, and may take into account authorized and attached modules in predicting the thrust required to hold the UAS in a hover state.

20 Claims, 3 Drawing Sheets

(56) References Cited

U.S. PATENT DOCUMENTS

2018/0321676 A1* 11/2018 Matuszeski .......... G05D 1/0055
2019/0355263 A1* 11/2019 Priest .................. G08G 5/0021
2020/0001990 A1* 1/2020 Jiang .................... B64D 35/00

* cited by examiner

ANOMALOUS PAYLOAD DETECTION FOR MULTIROTOR UNMANNED AERIAL SYSTEMS

CROSS-REFERENCE TO RELATED APPLICATIONS

This application claims the benefit of U.S. Provisional Application No. 62/589,221, entitled ANOMALOUS PAYLOAD DETECTION FOR MULTIROTOR UNMANNED AERIAL SYSTEM and filed on Nov. 21, 2017, which is hereby incorporated by reference in its entirety.

BACKGROUND

Technical Field

Embodiments described herein generally relate to the control of autonomous or teleoperated aerial vehicles.

Description of the Related Art

Autonomous and teleoperated drones, also referred to herein as unmanned aerial systems (UAS) have become increasingly easy to use. A user can program a GPS based flight path or mission.

Drones also typically have thrust to weight ratios of at least 2 to allow good dynamic flight characteristics such as fast flight and climb speed. This extra thrust margin allows most drones to carry some payload and still be capable of flight.

SUMMARY

In one aspect, an unmanned aerial system (UAS) is provided, including a UAS body, a plurality of propellers supported by the UAS body, each of the plurality of propellers driven by one of a plurality of motors, a sensor supported by the UAS body, a processor in communication with the sensor, the processor configured to receive an indication of an rotational speed at which at least one of the plurality of motors is rotating, receive information from the sensor, determine an indication of predicted flight power based on at least one of information received from the sensor and the indication of rotational speed of the motor, and detect an anomalous UAS configuration based at least on the determined indication of flight power.

In one embodiment, the processor can be configured to inhibit further flight of the UAS in response to detection of an anomalous UAS configuration. In one embodiment, the processor can be configured to cause the UAS to land response to detection of an anomalous UAS configuration. In one embodiment, the anomalous UAS configuration can include an unauthorized payload.

In one embodiment, the UAS can be configured to detect unauthorized payloads of less than 1% of the UAS weight. In one embodiment, the UAS can be configured to detect an anomalous UAS configuration based on a detection of an unauthorized payload of greater than 5% of the UAS weight.

In one embodiment, the UAS body can be configured to support modular components, and an anomalous UAS configuration can include an unauthorized modular component supported by the UAS. In one embodiment, the anomalous UAS configuration can include the use of a replacement propeller.

In one embodiment, the sensor can include an altitude sensor. In one embodiment, the sensor can include a temperature sensor. In one embodiment, the sensor can include includes a humidity sensor. In one embodiment, the sensor can include a pressure sensor.

In one embodiment, receiving an indication of an rotational speed at which at least one of the plurality of motors is rotating can include determining a rotational speed of the propeller driven by the at least one of the plurality of motors.

In another aspect, an unmanned aerial system (UAS) is provided, including a UAS body, the UAS body including at least one module coupling mechanism configured to support and retain a removable UAS component, a plurality of propellers supported by the UAS body, each of the plurality of propellers driven by one of a plurality of motors, a sensor supported by the UAS body, a processor in communication with the sensor, the processor configured to receive an indication of a rotational speed at which at least one of the plurality of motors is rotating, receive information from the sensor, determine an indication of predicted flight power based on at least one of information received from the sensor and the indication of rotational speed of the motor, and determine whether an unauthorized UAS component is attached to the UAS based at least on the determined indication of flight power.

In another aspect, a method is provided of detecting an anomalous UAS configuration, the method including receiving information from a sensor supported by the UAS, receiving information indicative of the rotational speed of at least one motor driving a propeller of the UAS, determining an indication of flight power based on at least one of the information received from the sensor and the indication of rotational speed of the motor, and detecting an anomalous UAS configuration based at least on the determined indication of flight power.

In one embodiment, the method can additionally include inhibiting further flight of the UAS in response to detection of an anomalous UAS configuration. In one embodiment, the method can additionally include causing the UAS to land response to detection of an anomalous UAS configuration. In one embodiment, detecting an anomalous UAS configuration can include detecting an unauthorized payload.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

Like reference numbers and designations in the various drawings indicate like elements.

DETAILED DESCRIPTION

Embodiments describe herein include software, hardware, and combinations thereof which can be used to allow unmanned aerial systems (UAS) to detect if any unauthorized payload has been attached to itself. Embodiments described herein also include actions which can be taken to prevent normal operation of the UAS if such an anomalous payload has been detected. While the embodiments described herein are applicable to a wide range of aircraft, they may in particular be used with consumer multi-rotor unmanned aerial systems. Such embodiments can be used to enforce safe operation of a UAS, and to help prevent a UAS from being used for nefarious acts. Such embodiments can also be used to prevent sub-optimal performance of the UAS which would result in consumer customers' dissatisfaction.

Embodiments described herein can be used to prevent use cases where a user may attach an unauthorized or unknown payload to a UAS. For example, a user may attach a device that they perceive will increase the utility of the UAS, such as the attachment of a flashlight for video subject illumination. In such a case, the added weight may cause undesirable flight characteristics resulting in poor video quality or even a crash of the UAS. A customer may then remove the payload and submit the UAS for warranty or post poor reviews based on the unintended use.

In some cases, a UAS may be tested and approved for a specific type of operation in the tested configuration. If the UAS is flown in a different configuration or with an additional payload the certification may be invalid. As an example, a UAS may be certified by the FAA for flight over people at a certain weight and with a safe configuration of the rotor set. Enforcing compliance with the certification increases the safety and utility of the certification.

In other cases, a user with nefarious intent may attach a harmful payload such as a weapon or explosive and send the UAS on a mission to the intended target. Preventing such a use case not only protects the intended target, but more generally allows certain classes of UASs which implement embodiments described herein to be perceived as safe by the general public. A UAS in accordance with such embodiments can be certified to contain this technology, and can thus be known to be capable only of its intended use.

To detect the presence of an unknown payload, a flight controller of a UAS can compares certain flight characteristics with the expected known characteristics in the absence of an unauthorized payload. In some embodiments, the flight controller can analyze the thrust required for hover. This can be done in many ways to varying degrees of accuracy depending on the available sensors on the USA. For example, such methods rely on the UAS having at least an estimate of its own attitude. In addition, the UAS relies on an accelerometer or an absolute altitude sensor, such as a GPS sensor or a barometer, to determine if the vertical flight acceleration is close to zero. Either of the aforementioned sensors allow detection of a hovering state, where the vertical thrust is equal to the weight of the UAS. When the UAS is in a hovering state, with no vertical acceleration, or a vertical acceleration close to zero, the attitude of the UAS allows calculation of the vertical component of thrust. The vertical thrust required for hover is the same as the system weight.

One direct way to detect additional weight is thus to measure the thrust directly. This could be achieved, for example, by strain gauge load cells at the interface between the motors and the UAS. By placing the UAS in a state in which vertical acceleration is minimal, a processor on board the UAS can receive information from the strain gauge load cells or a similar sensor, and can directly calculate the current operational weight of the UAS and compare the current weight to the anticipated weight, detecting an anomalous UAS operating condition such as overloading due to an unauthorized payload. Although some embodiments may include calculation of the current weight, other embodiments may simply compare the information from the strain gauges or similar sensors to expected sensor information under expected loading, or may otherwise compare an intermediate or alternate calculation other than the actual weight.

However, may embodiments of UASs may not include strain gauges or other sensors which allow direct calculation of thrust during operation of the UAS. In other embodiments, various combinations of sensors and calculations may be used to estimate thrust, allowing detection of a variety of anomalous UAS operating conditions.

In some embodiments, open loop calibration of motor controller inputs may be used in conjunction with other sensors to provide an indication of thrust power. Such techniques may be of particular use when the UAS lacks the ability to detect the rpm of the motor or to detect power delivered the motors. For example, such a monitoring scheme may be useful for hobby drones with electronic speed controllers (ESCs) with a pulse-width modulation (PWM) interface. The UAS may first be tested by the manufacturer, and the control input required to maintain a hovering state recorded. The input to an electronic speed controller can be the open loop duty cycle of the motor control waveform, and may not be a direct measure of the power delivered to the motor, at least because the required duty cycle for a certain power may vary with battery voltage. A calibration point can be taken over the range of operating voltages of the battery.

However, the power required for hover is not only a function of the weight of the UAS, but also changes with operating and environmental conditions, such as in particular air density. For UASs with additional sensors, the additional sensors can be used to further calibrate the UAS. For example, if the UAS includes a temperature sensor, the calibration can be performed over various temperatures in order to compensate for temperature effects on air density. If the UAS includes an absolute altitude sensor, such as a GPS sensor or a barometer, the calibration can be performed at different altitudes to compensate for changes in air density due to altitude.

During operation, the UAS can determine the appropriate expected control input required for hover, taking into account any available sensors. A lookup table may be provided including predetermined expected factory values. If the actual input when in a hover state differs from the expected input by a given threshold, a determination may be made that the UAS is operating in an anomalous configuration. This anomalous operation may be due to an additional payload, or to otherwise sub-optimal performance of the UAS. In embodiments in which the UAS is configurable in various configurations with different operating weights and/or flight parameters, as discussed in greater detail below, the lookup table used may be specific to the particular configuration in which the UAS is operating.

In other embodiments, the motor input may be measured and used in determining an indicator of thrust power. Many UASs include motor controllers which can measure and report the power delivered to each motor. Many UASs include battery systems which can measure and report the instantaneous battery voltage and current draw. Either or both of these indicators of power input to the system can be compared to expected power input to achieve a hovering state. In some embodiments, the expected power can be determined by factory calibration, or may be predicted or calculated using a model of the system.

In one embodiment, a model for required hover power $P_R$ at the motors is a function of the ideal power $P_I$ required for a known thrust, and is given by:

$$P_R = \frac{P_I}{Eff_P * Eff_M},$$

where $Eff_P$ is the propeller efficiency and $Eff_M$ is the motor efficiency, Since the propeller and motor efficiency are nearly constant around the hover point for most systems, the thrust T is calculated based on $$P_I = T \sqrt{\frac{T}{2*\rho*Area_{propeller}}},$$

where $\rho$ is the air density. As the area of the propeller is known for a given UAS, the expected power input required to maintain a hover state changes only with air density. As discussed above, temperature sensors and absolute altitude sensors may be used to estimate air density. Air density may be measured by using a pressure sensor and a temperature sensor on the UAS using the ideal gas law. In addition, humidity sensors may be used for increased accuracy in the estimation of the air density, as the humidity will cause a small change in the specific gas constant of air. However, the overall change in air density across the full range of humidity is roughly 1%, so many embodiments may omit the use of a humidity sensor for compensation unless very small deviations are being detected.

The measured power consumption can then be compared to the expected power consumption. If the power consumption when in a hover state differs from the expected power consumption by a given threshold, a determination may be made that the UAS is operating in an anomalous configuration. As discussed above, this anomalous operation may be due to an additional payload, or to otherwise sub-optimal performance of the UAS.

Similarly, many UASs include motor controllers that can measure and report the rpm of the motor. With a known rpm and propeller, the thrust T can be modelled as:

$$T = k_T \rho n^2 D^4,$$

where $k_T$ is the propeller thrust coefficient and D is the propeller diameter, which are constant and known for a given propeller, n is the rotational speed of the propeller, and $\rho$ is the air density. Using the reported propeller rotational speed n and an estimation of the air density, the calculated thrust generation at a given motor rpm is compared to the expected thrust required, and if the calculated thrust generation differs from the expected thrust required under those conditions, the a determination may be made that the UAS is operating in an anomalous configuration. It should be noted that for some UASs, the rotational speed of the motor may not have a 1:1 ratio to the rotational speed of the propeller, as the UAS may include gearing, a belt drive, or another component which causes the propeller to rotate at a different rotational speed than the driving motor.

In some embodiments, the rotational speed of the propellers, which is correlated to the rotational speed of the motor in a known manner for a given UAS design or configuration, can be measured directly using audio analysis of the sound of the propeller. In an embodiment in which the UAS includes a camera, a microphone, or another component which can be used to detect the noise or other effect caused by the rotation of the propeller, the information recorded by that component can be analyzed to determine the speed at which the propeller is rotating. For example, a camera supported by the UAS can record audio during a period at which the UAS is in a hover mode, and the recorded audio can provide an indication of the rotational speed of the propellers, as the audio can be analyzed to directly determine the rotational speed of the propellers.

As discussed above, the anomalous UAS operation may be due to overloading by an unauthorized payload, or may be due to a variety of other factors which can impact the performance of the UAS. In some embodiments the anomalous behavior may be due to replacement of the propeller of the UAS with a propeller of a different size or thrust coefficient, as discussed in greater detail below. In some embodiments, the anomalous UAS behavior may be due to changes in propeller performance due to damages to the propeller or associated components. In other embodiments, the anomalous UAS behavior may be due to changes in motor performance, such as damage to bearings or demagnetization of the motor. In other embodiments, the anomalous UAS behavior may be due to changes in motor controller performance, for example at certain battery voltages or temperatures. Occlusions to airflow or vertical flow of the surrounding air can also result in required hover thrust differing from predicted hover thrust under given conditions.

If anomalous UAS behavior is detected, a user may be prompted to inspect the system if any of the above are identified as possible causes for the anomalous hover control input, power or thrust. In some embodiments, the anomaly is significant enough to affect system performance, or if the anomaly is clearly due to a payload larger than any permitted error in the measurement, the UAS will become non-operational and force a landing. Depending on the sensors available on the UAS and the accuracy of the detection method, the threshold at which the flight-inhibiting protocol is triggered may vary. For example, in some embodiments, for a UAS including temperature and altitude sensors, any unauthorized payload of more than 5% of the system weight can be detected reliably, although other ranges of unauthorized payloads may also be detected.

In some embodiments, a threshold value for triggering a warning notice may be greater than a 1% deviation between the predicted flight power and the estimated flight power, greater than a 2% deviation, greater than a 5% deviation, greater than a 10% deviation, greater than a 20% deviation, greater than a 50% deviation, or any other suitable threshold. Similarly, in some embodiments, a threshold value for triggering the UAS to cease operation may be greater than a 1% deviation between the predicted flight power and the estimated flight power, greater than a 2% deviation, greater than a 5% deviation, greater than a 10% deviation, greater than a 20% deviation, greater than a 50% deviation, or any other suitable threshold. A threshold for triggering a warning may be lower than a threshold for ceasing operation of the UAS.

Figure 1:
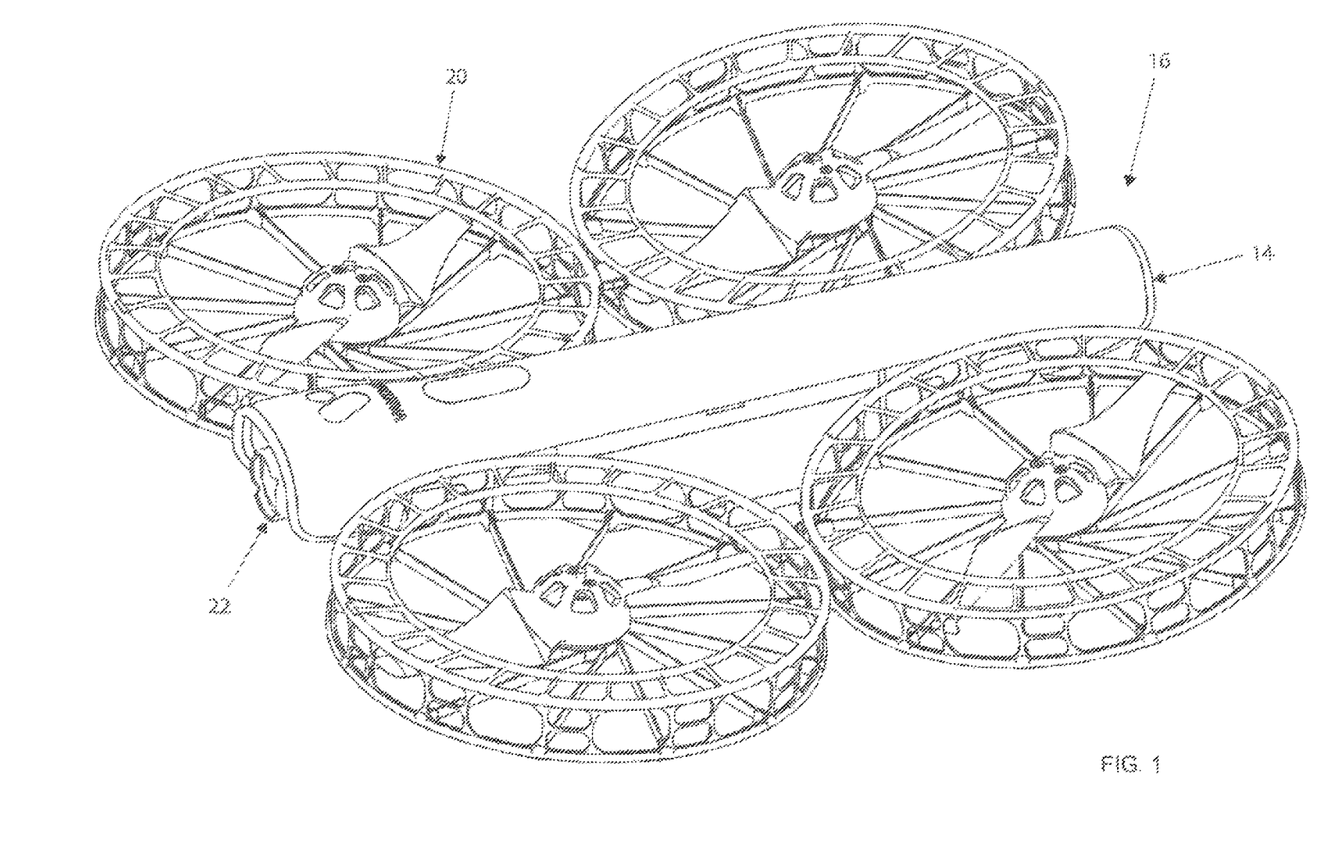
FIG. 1. shows an isometric view of a modular UAS including a pod with propeller protection.
Figure 2:
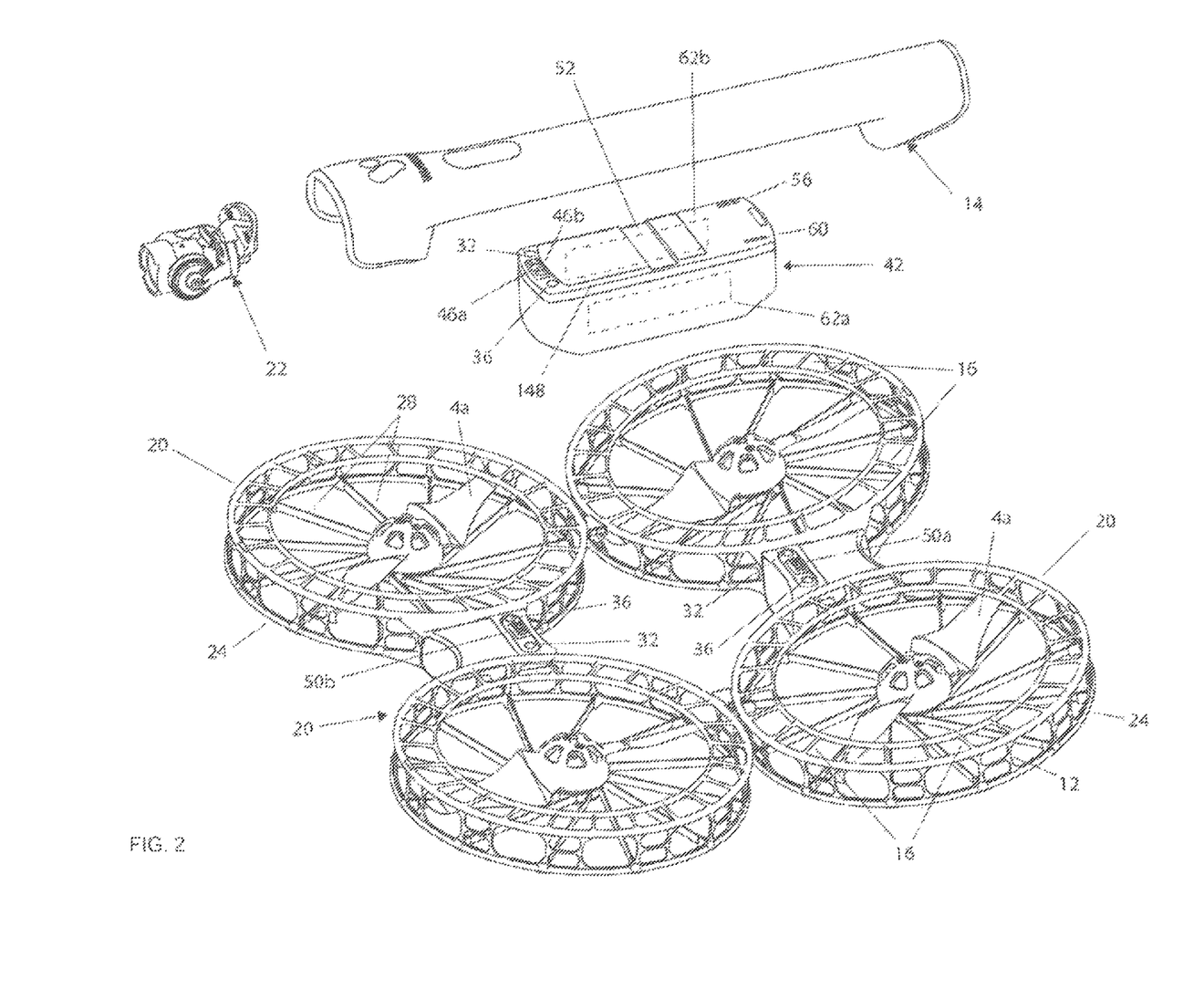
FIG. 2 shows an exploded isometric view showing the various peripheral modules comprising the UAS.

As noted above, however, the UAS may not be limited to a single configuration, but may include one or more peripheral modules which can be added to or replace components of the UAS. In some embodiments, a unmanned aerial vehicle (UAS) 16 may include a modular connection system that provides an interchangeable mechanical and electrical interconnection between a peripheral module 12 and a main body 10. FIG. 1 and FIG. 2 show one embodiment of a UAS 16 that includes a main body 10 that includes a fuselage 14, a peripheral module in the form of a safety rotor set 20, a peripheral module in the form of a camera gimbal 22, and a peripheral module in the form of a battery 42.

In the illustrated embodiment, the main body 10 of the UAS encloses a flight control processing subsystem that includes a microprocessor and several additional components, including motor controllers, radio-frequency communication circuitry, various sensors and non-volatile memory not specifically depicted herein.

In the illustrated embodiment, two peripheral modules of the UAS is a rotor set 20, which are an electro-mechanical assembly used for the generation of controlled thrust for maneuvering UAS 16. In the illustrated embodiment, the rotor set 20 includes four motors 8 and two each of propellers 4*a* and 4*b*, along with the requisite mechanical components for keeping the motor-propeller assemblies rigidly coupled in flight.

Safety rotor set 20 also includes features optimized protection against accidental contact with rotating propellers 4. In the illustrated embodiment, the safety rotor set 20 includes protective structures, which may include a perforated cylindrical rim 12, a plurality of top protective struts 16 that are integral to an injection molded pod top 20 component, and a plurality of structural and protective carbon fiber spokes 28 that are bonded to an injection molded pod bottom 24 component. In other embodiments, only some of these safety features may be included in a safety rotor set, or certain safety features may be included in addition to or in place other safety features described herein.

Safety rotor set 20 also includes electrical circuits, and electrical and mechanical connectors for attaching to fuselage 14. The safety rotor set 20 mechanical attachment subsystem can include a vibration isolation structure for minimizing the vibrational energy that is a by-product of the rotating propellers, from coupling to fuselage 14.

Rotor sets are not limited to the embodiment shown here. For example, a rotor set could be designed to fold into a very small volume and would constitute a highly portable rotor set. Other examples include a high-speed rotor set, an endurance rotor set, general purpose rotor set, a rotor set that is designed for heavy lift, and a rotor set that is designed for high altitude. Other examples of rotor sets, and of other peripheral modules or components such as battery packs and camera gimbals are described in greater detail in U.S. Patent Application Publication No. 2018/0244365, entitled MODULAR UAV WITH MODULE IDENTIFICATION and published on Feb. 24, 2017, the disclosure of which is incorporated by reference in its entirety.

FIGS. 1 and 2 show another peripheral module in the form of a rechargeable battery pack 42 that contains high output Lithium-ion cells and a power control subsystem, not depicted in detail herein. Battery 42 includes a digital communication link, and can also include a capacitive sense subsystem and a digital communication link. In some embodiments, capacitive sense electrodes 62*a* and 62*b* are adhered to or otherwise located adjacent to the inner walls of battery 42 enclosure. When battery 42 is attached to fuselage 14, an identifying digital message is sent to the microprocessor via the digital communication link, and a microprocessor 54 then enables various features associated with battery 42.

The function of UAS 16 may be enhanced by attaching peripheral modules beyond rotor sets or batteries. Various peripheral modules include the illustrated camera gimbal, along with other possible peripheral modules. Additional peripherals may include or provide additional sensors, processing capability, actuators, communications hardware or communications formats, or other capabilities. Example peripherals include a Lidar Obstacle-Avoidance module, cellular modem module, a DSM controller module, a combined cellular+DSM module, an illumination module, a sky writer module capable of writing letters and symbols in air using smoke, a speaker module, and a payload carry/drop module.

Peripheral modules and the main body 10 of the UAS may be designed designed so that peripherals communicate a unique identity to main body 10 so that a flight control processing subsystem 46 in main body 10 can alter the operation of software, values off onboard parameters, or user interfaces as appropriate for the new or different capabilities specific to each peripheral. For example, should a high-speed rotor set be attached to fuselage 14, upon detection and identification, the flight controller will better match the performance characteristics of the newly attached rotor set.

The attachment of a peripheral module may alter the weight of the system, or may alter other characteristics of the system, changing the thrust required to maintain a hover state. In some embodiments, the UAS can identify an attached and authorized peripheral module using a communications interface with the peripheral module, which can in some embodiments be physical and can in other embodiments be wireless. The modules will have a known weight, and in the case of a peripheral module including one or more rotors, will have known propeller properties, such that the expected required thrust determined to maintain a hover state under given conditions can be accurately determined or identified from a lookup table. This allows authorized add-on parts or peripheral module to be used without interfering with the detection of anomalous UAS behavior.

The UAS of FIGS. 1 and 2 can thus utilize a modular magnetic architecture to utilize the fuselage with different rotor sets or other peripheral modules which extend functionality. The rotor sets can identify themselves at the peripheral module connection site with the fuselage, allowing the techniques described herein to still be used for each specific configuration of fuselage, rotor sets, and other peripheral modules. The peripheral modules may have unique identifiers so that the expected hover thrust and power can be adjusted for the known properties of the authorized additional payload, while still detecting unauthorized payloads.

In some embodiments, a power based detection method such as the method described above, which takes into account the known properties of the propellers of the UAS, may be circumvented through the modification of the UAS. For example, a UAS could be modified through the replacement of existing propellers with larger propellers, which generate additional thrust for a power input. An unauthorized payload could be added without triggering the anomalous UAS operation detection. In some embodiments, supplemental or alternative methods of verifying UAS operation may be used to identify such modifications to the UAS.

In some embodiments motor rpm may be evaluated in addition to power input. While increasing the propeller size may result in a given power input generating increased thrust, this will also result in a readily detectable reduction in the rpm of the motor. By monitoring both the power input and the rpm, the reduction in the rpm of the motor may be detected, resulting in a determination that the UAS is operating in an anomalous fashion.

In other embodiments, other system dynamics may be used in addition to estimation of thrust at a hover state. A larger propeller will have a larger moment of inertia, and changes in the response of the propeller to a given input may be used to detect replacement or failure of a propeller. Additional payload will alter the inertia of the system, and thus the time constants of the UAS attitude and position controllers. Drag can also be measured by comparing flight speed to UAS tilt angle and thrust.

In an embodiment in which the UAS comprises a cowling or other protective structure surrounding the propeller, the dimensions of the cowling can limit the dimensions of any such replacement propeller, and provide additional protection against modification of the propeller to circumvent the various embodiments of overload detection described herein. In some embodiments, verification of a known rotor set comprising a protective structure can include confirmation, via a suitable sensor or other method, that the protective structure remains intact.

In other embodiments, the propellers themselves may be a verified component of the device, and the UAS may be configured such that the propellers, or other such peripheral components or modules connected to or forming part of other peripheral modules, are independently detectable and verified. In such embodiments, the connection between the component and the peripheral module may be a permanent or hardwired connection, or the peripheral module may itself include another peripheral module connection site. Communication with the processor in the fuselage may be through another peripheral module, or in the case of a wireless communication, may be directly with components within the fuselage.

Figure 3:
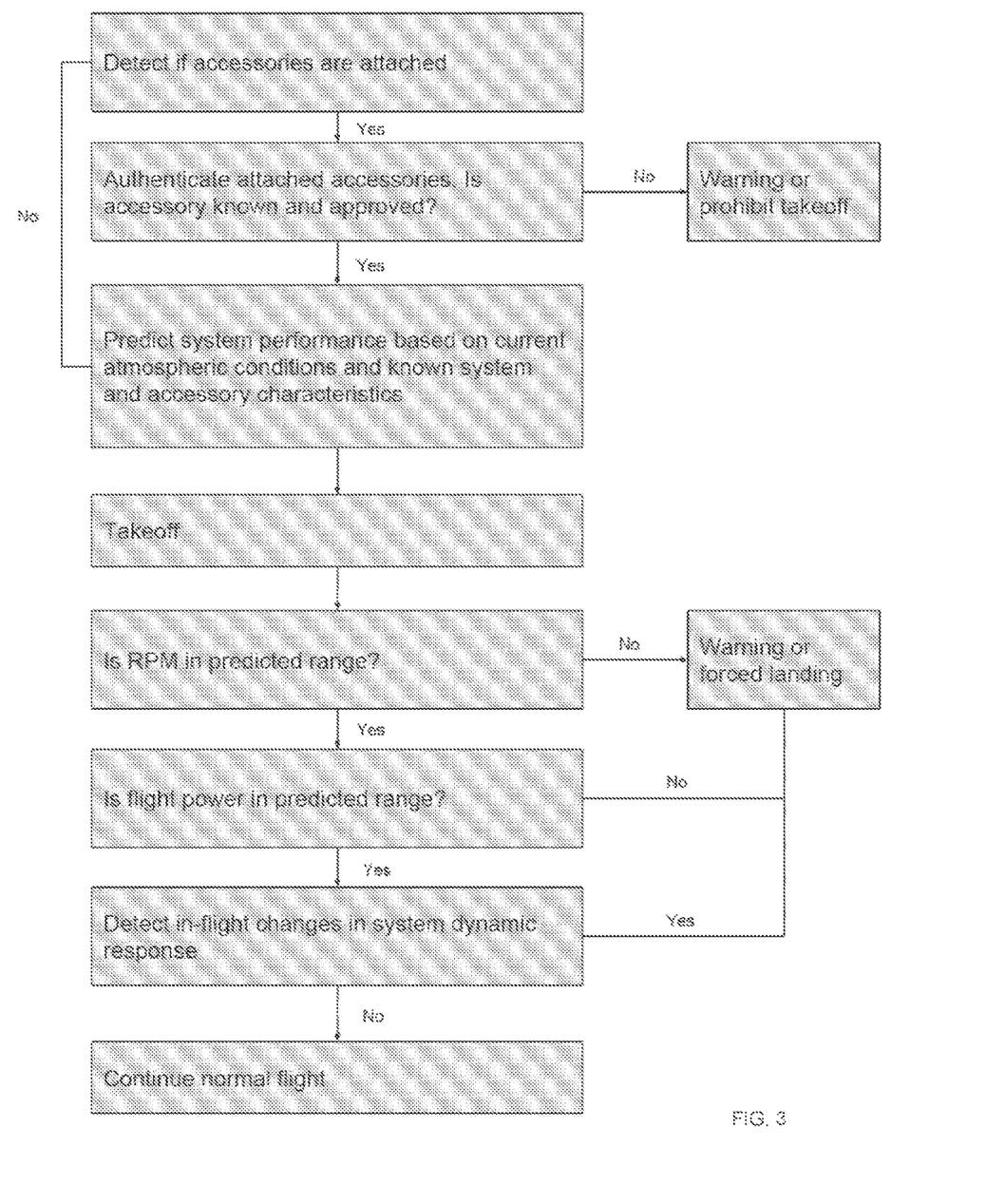
FIG. 3 is a flow diagram illustrating a payload validation control process for a UAS.

FIG. 3 is a flow diagram illustrating certain stages in an example control process for detecting anomalous UAS operation. If the UAS is a modular UAS, the process can include a stage at which accessories are detected. If so, the process can move to a stage where attached accessories are authenticated to determine if they are known and approved. If not, the UAS may move to a stage where a warning is given, or where takeoff of the UAS is prohibited. If no accessories are attached, or if all attached accessories are approved, the UAS may move to a stage where the system performance is predicted based on sensor information indicative of current atmospheric conditions and the known configuration of the UAS. The UAS may then take off. It will be understood, however, that the prediction of the system performance may occur after takeoff, or may be done continuously or periodically based on updated information received from the sensors.

During UAS operation, various parameters of the UAS may be monitored. For example, if the UAS is capable of detecting and reporting motor RPM, the process may move to a stage where a determination is made as to whether the RPM is within the predicted range when the UAS is in a hover state. If the UAS is capable of estimating current flight power as discussed above, the process may move to a stage where a determination is made as to whether the current flight power is within the predicted range when the UAS is in a hover state. If the UAS is configured to detect other changes in the dynamic response of the UAS, the process may move to a stage where a measurement indicative of the dynamic response of the UAS is made and compared to a predicted response. If any of these comparisons deviate from the expected result or value by an amount which exceeds a detection threshold, the UAS may determine that the UAS is operating in an anomalous fashion, and may trigger a warning or force a landing. If not, the UAS may continue normal flight. These measurements and comparisons may occur periodically or constantly during operation of a UAS, or may occur only after UAS takeoff.

Although the drawings schematically depict an example monitoring process in the form of a flow diagram, it will be understood that certain operations may be omitted in various embodiments, and other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. In some embodiments, the described actions can be performed in a different order and still achieve desirable results.

In addition, certain information described herein as being obtained from a sensor included within the UAV can be instead received from an external system, such as from a web service, from a phone or other computing device used to control the UAS, from base station sensors such as pressure and temperature sensors. Any suitable external sources of information which can be used to provide information regarding atmospheric properties, or information which can be used to estimate atmospheric properties, can be used. In some embodiments, certain information can be provided by the UAS to an external system, and the calculations regarding comparison of expected performance to predicted performance can be done by the external system, and a warning notice or instructions to halt operation of the UAS can be sent from the external system.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. In some examples, certain structures and techniques may be shown in greater detail than other structures or techniques to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An unmanned aerial system (UAS) comprising:
   a UAS body;
   a plurality of propellers supported by the UAS body, each of the plurality of propellers driven by one of a plurality of motors;
   a sensor supported by the UAS body;
   a processor in communication with the sensor, the processor configured to:
      receive an indication of a rotational speed at which at least one of the plurality of motors is rotating;
      receive information from the sensor;
      determine an indication of predicted flight power based on at least one of information received from the sensor and the indication of rotational speed of the motor; and
      detect an anomalous UAS configuration based at least on the determined indication of flight power.

2. The UAS of claim 1, wherein the processor is configured to inhibit further flight of the UAS in response to detection of an anomalous UAS configuration.

3. The UAS of claim 1, wherein the processor is configured to cause the UAS to land response to detection of an anomalous UAS configuration.

4. The UAS of claim 1, wherein the anomalous UAS configuration comprises an unauthorized payload.

5. The UAS of claim 2, wherein the UAS is configured to detect unauthorized payloads of less than 1% of the UAS weight.

6. The UAS of claim 2, wherein the UAS is configured to detect an anomalous UAS configuration based on a detection of an unauthorized payload of greater than 5% of the UAS weight.

7. The UAS of claim 1, wherein the UAS body is configured to support modular components, and wherein anomalous UAS configuration comprises an unauthorized modular component supported by the UAS.

8. The UAS of claim 1, wherein the anomalous UAS configuration comprises at least one a replacement propeller.

9. The UAS of claim 1, wherein the sensor comprises an altitude sensor.

10. The UAS of claim 1, wherein the sensor comprises a temperature sensor.

11. The UAS of claim 1, wherein the sensor comprises a humidity sensor.

12. The UAS of claim 1, wherein the sensor comprises a pressure sensor.

13. The UAS of claim 1, wherein receive an indication of an rotational speed at which at least one of the plurality of motors is rotating comprises determining a rotational speed of the propeller driven by the at least one of the plurality of motors.

14. The UAS of claim 1, wherein the processor is supported by the UAS body.

15. The UAS of claim 1, wherein determining an indication of flight power comprises determining an indication of thrust power generated by the UAS.

16. An unmanned aerial system (UAS) comprising:
a UAS body, the UAS body comprising at least one module coupling mechanism configured to support and retain a removable UAS component;
a plurality of propellers supported by the UAS body, each of the plurality of propellers driven by one of a plurality of motors;
a sensor supported by the UAS body;
a processor in communication with the sensor, the processor configured to:
receive an indication of a rotational speed at which at least one of the plurality of motors is rotating;
receive information from the sensor;
determine an indication of predicted flight power based on at least one of information received from the sensor and the indication of rotational speed of the motor; and
determine whether an unauthorized UAS component is attached to the UAS based at least on the determined indication of flight power.

17. A method of detecting an anomalous UAS configuration, the method comprising:
receiving information from a sensor supported by the UAS;
receiving information indicative of the rotational speed of at least one motor driving a propeller of the UAS;
determining an indication of flight power based on at least one of the information received from the sensor and the indication of rotational speed of the motor; and
detecting an anomalous UAS configuration based at least on the determined indication of flight power.

18. The method of claim 17, additionally comprising inhibiting further flight of the UAS in response to detection of an anomalous UAS configuration.

19. The method of claim 17, additionally comprising causing the UAS to land response to detection of an anomalous UAS configuration.

20. The method of claim 17, wherein the detecting an anomalous UAS configuration comprises detecting an unauthorized payload.

* * * * *